Feb. 26, 1957 L. P. HANSON ET AL 2,783,326
ELECTRIC SWITCHING MEANS
Filed Aug. 23, 1955 2 Sheets-Sheet 1

LOUIS P. HANSON
HOWARD H. SUSKIN
INVENTORS

BY
Smith & Tuck

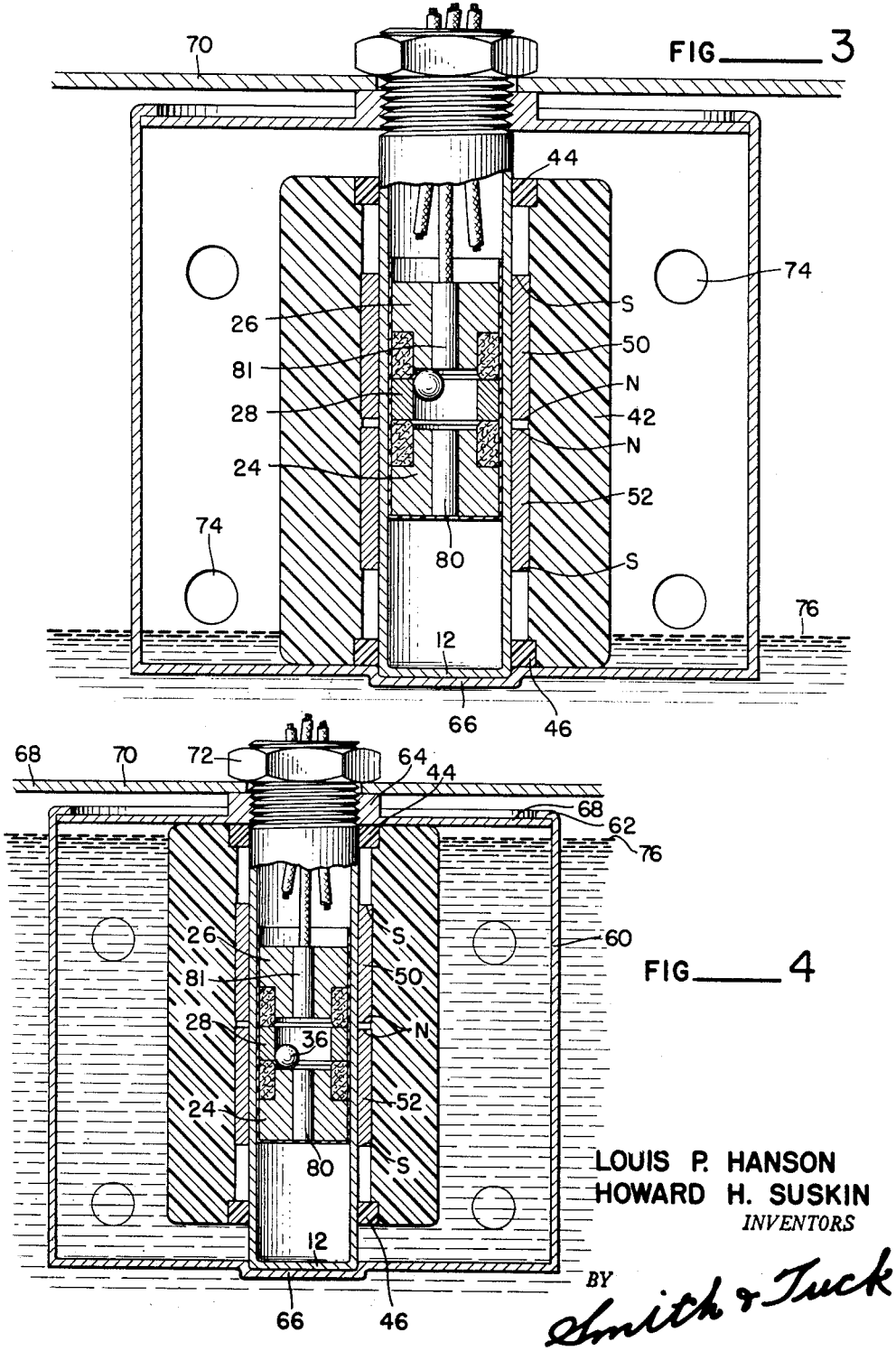

United States Patent Office 2,783,326
Patented Feb. 26, 1957

2,783,326

ELECTRIC SWITCHING MEANS

Louis P. Hanson and Howard H. Suskin, Seattle, Wash.

Application August 23, 1955, Serial No. 530,004

7 Claims. (Cl. 200—84)

This present invention relates to an electric switching means, the electrical elements of which are wholly contained within a sealed operating tube. The mechanical means performing the actual switching operation is energized by the flux from annular magnets which encircle the enclosing tube or housing and which in turn are positioned by any suitable means. When liquid level is being sensed a tubular float which also encircles the enclosing housing of the electrical elements, and carries the magnets, serves very satisfactorily.

This invention has provided an electric switching means that has been found particularly useful as a fluid level control switch, as a mechanical switch, or wherever a switch is required to operate without a direct mechanical connection to the sensing agency. This switch is designed to establish or interrupt electric current upon suitable actuation by means exterior to the sealed container housing the electrical switching elements. The switching element consists, in its present preferred form, of a metal ball which is positioned within the common switch contact element and is magnetically moved into operational contact with one or the other of electric contact members, which three contact members are all coaxially aligned. This arrangement makes it possible to provide a switching means which contains no springs, has only one internal moving part and may be completely hermetically sealed. Switches of this type lend themselves to a wide range of applications.

There are many uses for a switch which will control the level of liquids. One very important example of this requirement is in airplane construction where a plurality of fuel tanks are employed and it has been desirable that the level of the fuel in the various tanks can be maintained at such levels as operational requirements of the airplane indicate as desirable. Many devices have been provided for this purpose in the past. Experience has proven that the bulky switches involving a plurality of complicated mechanical parts and especially those relying upon springs to cause vertical functioning have proven generally unsatisfactory. On the other hand this present invention provides a switch which is small in size and light in weight as compared to other known magnetically operated switching means. The free magnetic contact member has a free action each time a contact is made consequently, new mating contact surfaces are being selected normally each time the switch is operated. This switch is extremely resistant to the effects of vibration and shock because of the small mass of the movable contactor and extremely high actuating force available. Because of the novel features enumerated and many additional ones which will be more fully developed in the following specification, it is believed that a very worthwhile advancement has been made in this present field.

One of the principal objects of this invention is to provide a simple, reliable and inexpensive device for accomplishing electric current switching under the many trying environments involving vibration, shock, and the like, such as is particularly common to air craft applications.

A further object of this invention is to provide an electric current switching means which is small in size and light in weight so that it may be employed in many of the difficult situations which can not now be served by recognized existing equipment.

A further object is to provide a switching means which may be operated by means of an exterior magnetic field and which requires no mechanical connections to the switching means itself.

A further object of this invention is to provide a free metallic switching element which is held in position by magnetic attraction and when it is caused to function a moving force must overcome the magnetic retentivity of the magnetic switching element and thus a definite and reliable snap action is provided which insures breaking electrical connection with a minimum of arcing.

A further object of this invention is to provide a switch having a free contact element acting under magnetic attraction and annular contact members so positioned as to insure a large number of possible contact points.

Further objects, advantages and capabilities will be apparent from the description and disclosure in the drawings, or may be comprehended or are inherent in the device.

In the drawings:

Figure 3 is a typical vertical sectional view taken through the axis of one embodiment of this invention;

Figure 4 is a view similar to Figure 1 but showing the alternate extreme position of the float and the associated parts which provide the functioning sequence of this device.

Figures 1, 2:
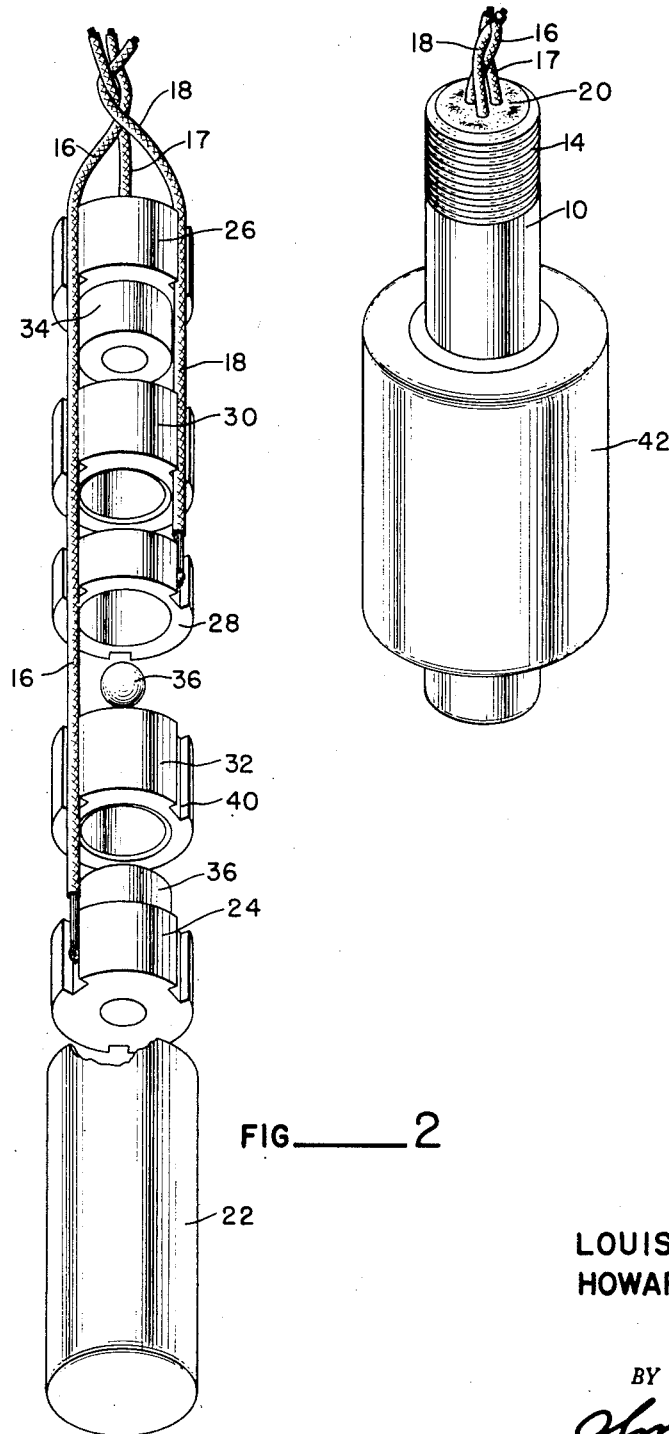
Figure 1 is a perspective view illustrating the switching means in its sealed-in condition and with the controlling float encircling the same.
Figure 2 is an exploded perspective view illustrating, in spaced relationship, the elements which form the switching means of this device.

Referring more particularly to the disclosure in the drawings, the numeral 10 designates the enclosing tube for the electro-magnetic switching means. This tube should be of non-corrosive material that also is non-magnetic. Many of the stainless steel tubings available today meet thse requirements and such have proven very satisfactory in use. Tube 10 is provided with a closed bottom, as 12, and the upper end is threaded, as at 14, as a means of holding the device in its operational position. Three electric leads, as 16, 17 and 18 are brought out the open end of tube 10 through a hermetically sealed header 20. Disposed within tube 10 in axial alignment therewith are the elements illustrated in Figure 2. These consist of an insulating tube 22, the two oppositely disposed magnetic pole contacts, as 24 and 26, to which electrical conductors 16 and 17 are secured respectively. Disposed intermediate the pole contacts 24 and 26 is the magnetic ring contact 28. This member has secured to it the electrical conductor 18. Disposed on each side of ring contact 28 are the insulating and spacing members 30 and 32. The assembly of these units is more clearly shown in Figures 3 and 4. It has been found convenient to reduce the diameter of the magnetic pole contact 24 and 26, as is indicated at 34 and 36 respectively, and this provides a positive positioning of the insulating members 30 and 32 so that an exact gap will be provided between the magnetic ring contact 28 and the pole pieces 26 and 24 respectively.

Throughout the various drawings the magnetic ball 36 is an exemplification of the movable contact member. This ball, of course, would not function satisfactorily in axial alignment with the other parts, as can be noted from a study of Figures 3 and 4. It should be noted that the ball form appears to be the most practical for all around functioning, but as the unit is held in place by magnetic attraction of the three magnetic members the contact member may take on any convenient form, as a block or a cylinder which would slide. The latter forms have not been illustrated in the present drawings. It is to be noted that the various coaxially aligned members, exclusive of the insulating tube 22, have keyways as 40 for the convenient passage of the electrical conductors, while the lower units, as illustrated in Figure 3, will only need one such groove or keyway. Manufacturing technique indicates that all the units should have these grooves spaced at 120 degrees apart substantially, so that the various parts will be readily interchangeable.

For use in liquid level control there is shown disposed around tube 10 and adapted to readily slide thereon, the float 42, which may be made from any suitable material. One material that is commercially available and sold under the name of "Hycar" has proven very satisfactory. This is a foam or sponge-like block of super-cured sponge rubber, also foam may be substituted as it also combines lightness and durability and freedom from deterioration in most liquids and particularly those liquids used as fuel for aircraft engines. At each end of float 42, which preferably is cylindrical in form, are provided the guiding bearings, as 44 and 46. These bearings are annular rings formed preferably of a dense plastic material of which nylon has proven very satisfactory. Fixedly secured within float 42 are two magnets of tubular form, indicated at 50 and 52. It will be noted that magnets 50 and 52 are spaced apart and their positioning and the proportions of float 42 should be such that in the float's lowermost position the magnetic ring contact 28 will be fully enclosed within the upper magnet 50, and in the float's uppermost position the magnetic ring contact will be fully enclosed within the lower magnet 52. This has been found to be a desirable relationship and the proportioning of the unit otherwise can be made to best suit the conditions anticipated. Only members 50, 52 are preferably permanent magnets and ball 36 and members 24, 26 and 28 are preferably only susceptible to induced magnetism and need not be ferric and hence readily change in polarity.

As an example of the operation of this switch with a diameter of tube 10 taken as .375 inch and the other operating parts in proportion. The required magnet travel from one point of actuation to the other is approximately .15". The magnet may travel past the actuation point approximately .2" without a lessening of contact pressure. It should be pointed out that the magnet travel required is a secondary function of the magnet length and a primary function of the length of the switch parts enclosed in the tube.

For many uses the elements shown in Figures 1 and 2 will function satisfactorily and for other than liquid level control float 42 may be considered as only a convenient positioning means for the energizing magnets employed. For liquid level sensing, the assembled unit, consisting of float 42 and its enclosed magnets 50, 52 are assembled and then inserted in an enclosure 60. This enclosure may be made of any suitable material, sheet metal has been found to be very practical in that after the unit has been inserted a threaded neck portion of the cover 62, which is illustrated at 64, is threaded onto the threaded portion 14 of tube 10. The assembly then is lowered into container 60 with tube 10 coming to rest in a depression formed at 66 in enclosure 60 and then, at that time, the sidewall of enclosure 60 is then preferably spun over cover 62, as is illustrated at 68. The unit is now ready for installation in the tank it is to be associated with and this has been illustrated only by showing the upper wall of the tank, as 70. The complete assembly is now secured in place as by the nut 72, which also engages the threaded portion 14 of tube 10. Any suitable seating means may be employed between neck 64 and tank wall 70 to insure tightness at this point. When so installed all the working parts are well within the tank leaving only the electric connectors to provide operational connection thereto. Means are provided as by a plurality of openings 74, which may be in the wall or bottom, or both of containers 60, so that the liquid level 76 will be the same within enclosure 60, as in other parts of the tank.

In its simplest form of stating the functioning of the device, magnets 50 and 52 may be considered to be a single magnet or two magnets, as illustrated, or each of these magnets might be considered to be a plurality of small bar magnets disposed with their axis parallel to the longitudinal axis of tube 10. These magnets are caused to move axially along tube 10 by forces exerted, as by a float in a liquid level switch application or by other mechanical position sensitive devices in other applications.

A more detailed description of the operation is substantially with the magnets in the axial position shown in Figure 4. Ball 36 is attracted to magnetic pole 24 and the ball, due to the high magnetic flux intensity between pole piece 24 and contact ring 26, results from the favorable flux path from magnet 52 through pole contact 24, ball 36 and ring contact 28. The magnetic flux intensity between magnet 50, ring 28 and pole contact 26 is much less owing to the longer flux path in that part of the path. Experience indicates that with magnet 50 in the position shown, and in the absence of magnet 52, ball 36 is repelled from the region between ring contact 28 and magnetic pole contact 26. This phenomenon increases the tendency of ball 36 to seek the region between magnetic pole contact 24 and magnetic ring contact 28 when the magnets are disposed as shown in Figure 4. Ball 36 remains in contact with pole 24 and ring 28, after having established contact, when the magnets are translated to the position where the gap between magnets 50 and 52 is well within the longitudinal limits of ring 28. The use of opposed magnets as 50 and 52 substantially increases the reliability of the snap action and increases contact pressures. High contact pressure is maintained to point of transfer.

When, however, the magnets are translated into the approximate position shown in Figure 3, ball 36 suddenly transfers to the region between ring 28 and magnetic pole contact 26, thus establishing electrical contact between ring 28 and pole 26. The transfer is due to the weakened flux intensity between pole 24 and ring 28, the repelling of ball 36 by the region of pole 24 and ring 28 and the attraction region of ring 28 and pole 26 on the moving device. It has been determined that high contact pressure exists until transfer occurs. The establishment of high contact pressure upon transfer to the opposite side is instantaneous, and thus the requirement of satisfactory switching action is thereby fulfilled and a quick breaking of an established circuit can be achieved.

It has been found advantageous to place a concentric hole in magnetic pole contact members 24 and 26 with the hole being filled by non-magnetic material, as at 80 and 81. A central core of non-magnetic material or a hollow opening produces a force on the ball or sliding block in a radial direction away from the center thus assuring contact with ring 28. Flux intensity in the extreme center of the contact surfaces of poles 24 and 26 is thus greatly reduced. Ring 28 is not, therefore, attracted to the center of pole 24 and 26 contact surfaces. If the ball were to be attracted to the center of the contact surfaces, contact between the pole contact, the rolling device, and the ring contact would not be established and the switch would not accomplish its purpose. While a single magnet can be made to operate the switch, the repelling effect noted above can not be well utilized. In addition, contact pressure before transfer lowers appreciably, such phenomena being undesirable in a switch.

When it is considered that a workable arrangement of this device can be provided where the outside diameter of the magnetic ring 28 is approximately one-quarter of an inch with an inside diameter of substantially one-eighth of an inch any arcing that occurs during the switching operation is readily extinguished because of the very small volume enclosed. Switching means of this small size can be used to safely handle currents passing 140 milli-amps at 28 volts.

It is believed that it will be clearly apparent from the above description and the disclosure in the drawings that the invention comprehends a novel construction of an electric switching means.

Having thus disclosed the invention, we claim:

1. Electric switching means, comprising: first and second pole members and an intermediate member in spaced insulated relationship and an electrical lead to each, the intermediate member being annular and a ball contained therein and shiftable between a first position contacting the first pole and intermediate members and a second position contacting said intermediate and second pole members, said pole and intermediate members and said ball being magnetically susceptible, an actuator movable in a direction parallel to the line between said first and second pole member and said actuator including magnetic field means and being movable responsive to externally applied force between a first position in which a primary magnetic field passes through said first pole and intermediate members and a second position in which a primary magnetic field passes through said second pole and intermediate members, and the magnetic field means being of sufficient strength to move said ball between its first and second positions responsive to the movement of said actuator between the actuator's first and second positions thereby performing the switching operation.

2. The subject matter of claim 1 in which said actuator magnetic field means is complex and includes magnetic means having a secondary opposed field including said second pole member in the first actuator position and including said first pole member in the second actuator position to repulse the ball toward the pole and intermediate members in said primary field.

3. The subject matter of claim 1 in which the said first and second pole members have through openings at their centers directed toward each other filled with non-magnetic material whereby the ball will tend to assume an outer position against the inner wall of the annular intermediate member insuring contact therewith in all positions.

4. Electric switching means, comprising: an actuator for activating the switch when moved responsive to externally applied forces and including a magnetic field, first, second and third magnetically susceptible members positioned in series in spaced apart insulated relationship and a shifter magnetically susceptible member movable between a first position bridging the first and second members and a second position bridging said second and third members and said magnetic field being of sufficient strength to move said shifter member between said first and second positions as said field moves with said actuator between a position extending through said first and second members and a position extending through said second and third members, electrical leads to said first, second and third members, said magnetic field is complex including first and second flux areas in opposed relationship relative a line between said first and third members with a first flux area lapping the first and second members while second flux area laps only the third member in one actuator position and in the other actuator position the second flux area lapping the second and third members while the first flux area only lapping the first member whereby the shifter member is subject to both attraction and repulsion.

5. Electric switching means, comprising: first and second magnetically susceptible pole members in insulated, spaced apart relationship, and an intermediate magnetically susceptible member between and spaced and insulated from said first and second pole members, a shifter magnetically susceptible member movable between a first position bridging said first pole and intermediate members and a second position bridging said second pole and intermediate members, an actuator and means supporting said actuator for at least limited movement in a direction substantially parallel to the line between said first and second pole members, for activating the switch when moved responsive to externally applied force, a first and a second permanent magnet supported by said actuator and spaced apart relative the line of travel of the actuator and having oppositely faced poles, and in a first position of said actuator a first of said permanent magnets lapping said first pole and intermediate members attracting the shifter member to bridge the same and a said second position of said actuator the second permanent magnet lapping said second pole and intermediate members attracting the shifter member to bridge the same, the permanent magnet not in lapping relationship in each position exercising a repulsing force on the shifter member, and an electrical lead to said first and second pole and intermediate members.

6. Electric switching means, comprising: a hollow seated tube and an actuator supported for at least limited movement longitudinally of said tube for activating the switch when moved responsive to externally applied force, said actuator member including a first and a second permanent magnet with opposed poles, first and second magnetically susceptible pole members in said body in insulated spaced apart relationship; an intermediate magnetically susceptible member in said body between and spaced and insulated from said first and second pole members; and a shifter magnetically susceptible member movable in said body between a first position bridging said first pole member and said intermediate member and a second position bridging said second pole member and said intermediate member, said magnets being of such strength as to move said shifter member between said first and second positions responsive to the movement of said actuator between a first position in which only said first magnet laps said first pole and intermediate members and a second position in which only said second magnet laps said second pole and intermediate members, the permanent magnets not in lapping position on each occasion exercising a repulsing force on the shifter member, and electrical leads to said first and second pole and intermediate members.

7. The subject matter of claim 6 in which said actuator includes a float encircling said tube and said permanent magnets are tubular in shape and encircle said tube.

References Cited in the file of this patent

UNITED STATES PATENTS

| 995,414 | Nault | June 13, 1911 |
| 2,658,970 | Hurley | Nov. 10, 1953 |
| 2,727,959 | Proctor | Dec. 30, 1955 |

FOREIGN PATENTS

| 481,122 | Great Britain | Mar. 4, 1938 |
| 613,270 | Great Britain | Nov. 24, 1948 |
| 658,662 | Germany | June 29, 1938 |
| 669,932 | Great Britain | Apr. 9, 1952 |